Feb. 26, 1957 J. EWING 2,782,733
RAILROAD CAR FOR TRANSPORTING ROAD VEHICLES
Filed Sept. 16, 1954 4 Sheets-Sheet 1

INVENTOR.
JOSEPH EWING.
BY
Moses, Nolte, Crews & Berry
Attorneys.

Feb. 26, 1957 J. EWING 2,782,733
RAILROAD CAR FOR TRANSPORTING ROAD VEHICLES
Filed Sept. 16, 1954 4 Sheets-Sheet 2
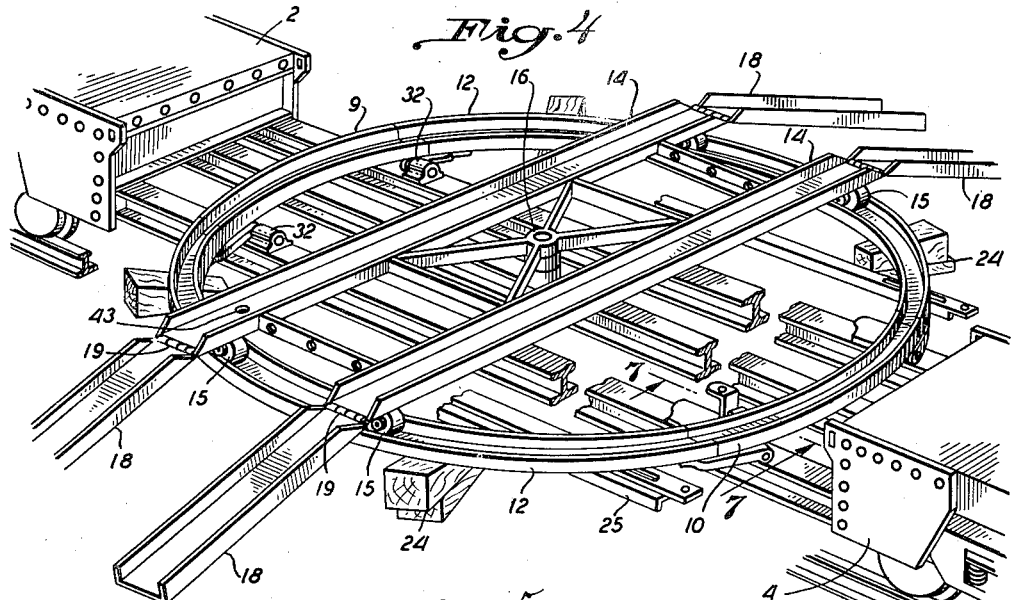
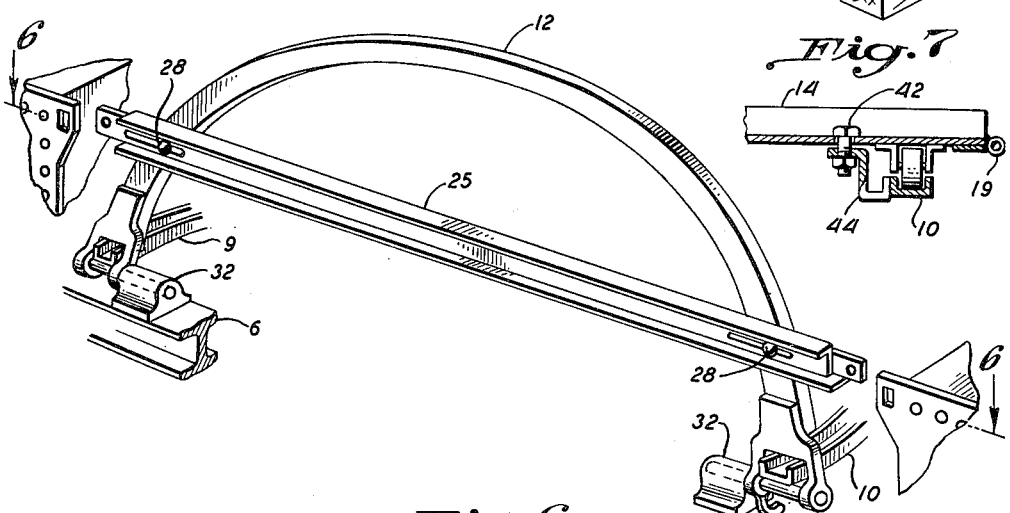
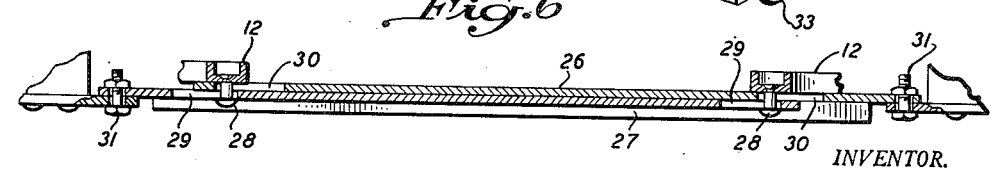
INVENTOR.
JOSEPH EWING.
BY
Moses, Nolte, Crews & Berry
Attorneys.

Feb. 26, 1957 J. EWING 2,782,733
RAILROAD CAR FOR TRANSPORTING ROAD VEHICLES
Filed Sept. 16, 1954 4 Sheets-Sheet 3
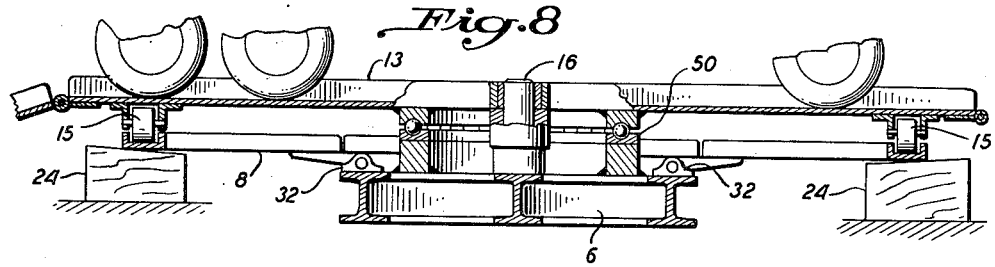
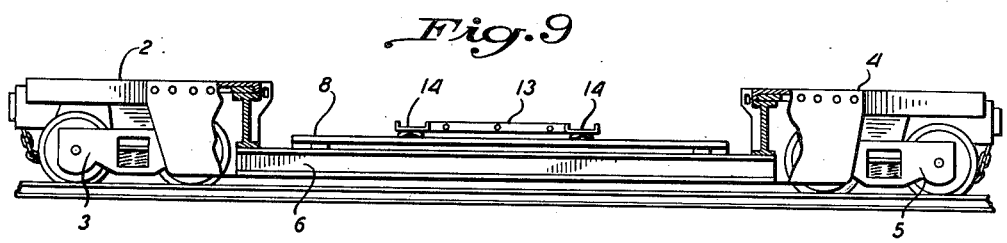
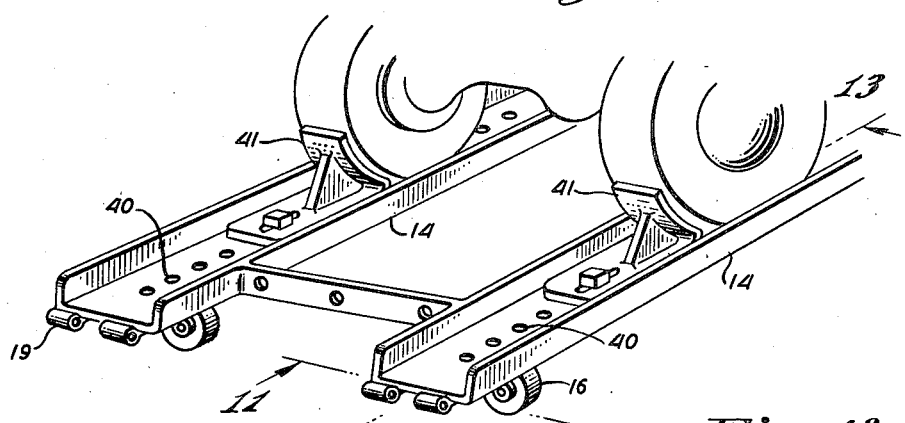
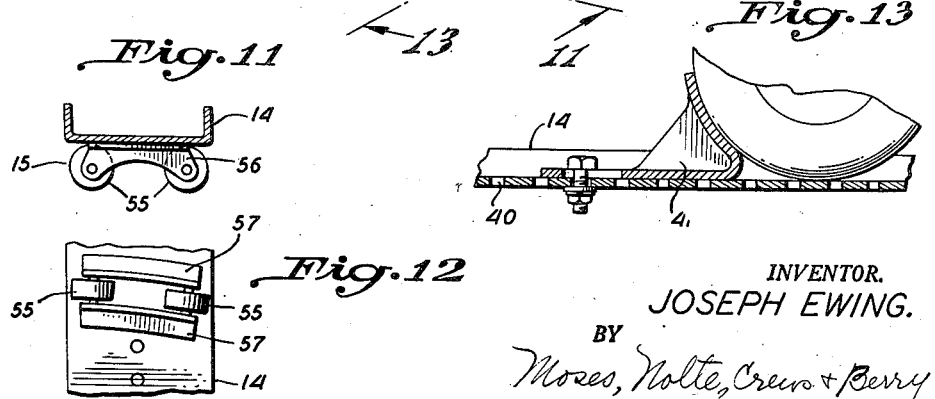
INVENTOR.
JOSEPH EWING.
BY
Moses, Nolte, Crews & Berry
Attorneys.

Feb. 26, 1957 J. EWING 2,782,733
RAILROAD CAR FOR TRANSPORTING ROAD VEHICLES
Filed Sept. 16, 1954 4 Sheets-Sheet 4
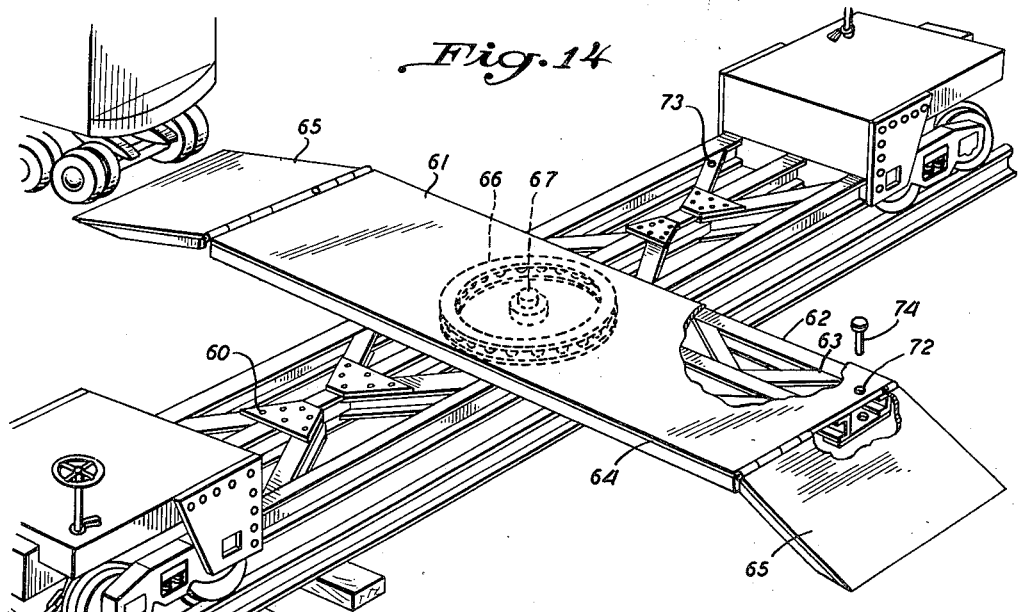
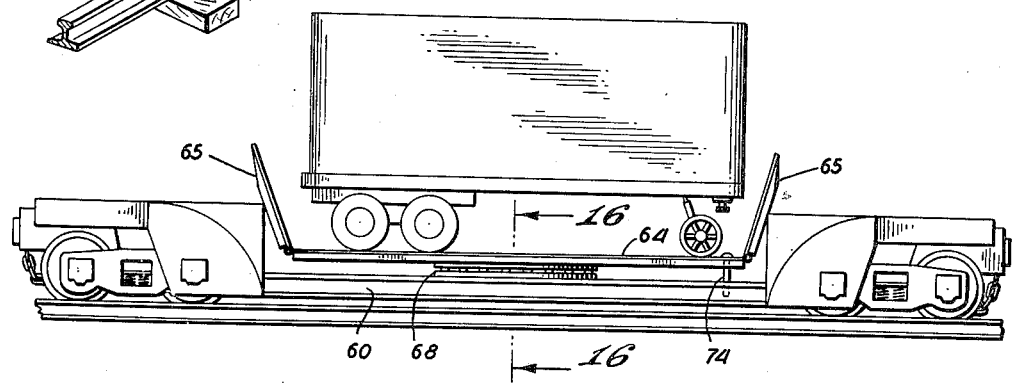
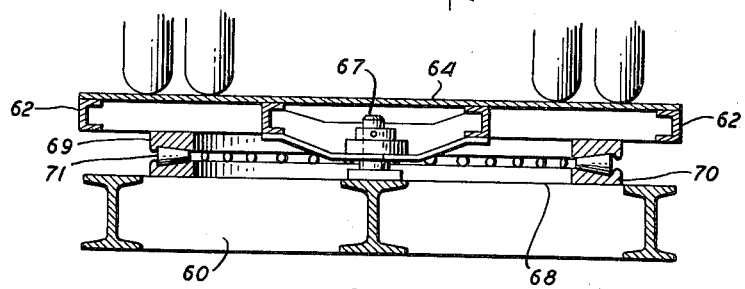
INVENTOR.
JOSEPH EWING.
BY
Moses, Nolte, Crews & Berry
Attorneys.

United States Patent Office 2,782,733
Patented Feb. 26, 1957

2,782,733

RAILROAD CAR FOR TRANSPORTING ROAD VEHICLES

Joseph Ewing, Bedford Village, N. Y.

Application September 16, 1954, Serial No. 456,478

3 Claims. (Cl. 105—368)

This invention relates to railroad cars and more particularly to railroad cars for hauling automobile trailers or trucks.

Large trucks and particularly the trailers of such trucks can be efficiently hauled over long distances by railroad. It is a very considerable problem, however, to load and unload the trailers from railroad cars, especially when the cars are coupled together into a train. It is desirable to accomplish the loading and unloading without moving each car to a loading platform. It is also desirable to avoid the use of expensive loading and unloading facilities and machinery and to minimize the machinery or mechanical devices required on each car. For reasons of cost competition it is also very important to reduce the manpower and time required for loading and unloading and to make these operations so simple that they may be performed safely by inexperienced persons.

It is a general object of the invention to satisfy the above considerations by providing an improved railroad car for transporting automotive vehicles.

A particular object of the invention is to provide a rotatable loading platform for the railroad car which has maximum safety with respect to tipping, twisting or bending in the loading position. This object is accomplished by providing a turntable which has a diameter substantially equal to the length of the loading platform, so that the loading platform is supported even at its ends and does not have unsupported overhanging ends which may be subjected to great and unbalanced forces by the load.

Another object of the invention is to provide a low-friction turntable which can be turned with little effort and without mechanical devices.

A further object of the invention is to provide ramps for the loading platform which have maximum flexibility and are attachable and removable safely and readily with little effort.

Other objects and novel features of the invention will become apparent and the invention will be fully understood from the following description and the accompanying drawing of several embodiments of the invention.

Fig. 4 is a perspective view with the loading platform in the loading position.

Fig. 5 is a perspective view of a portion of the loading platform.

Fig. 6 is a sectional view taken along the line 6—6 of Fig. 5.

Fig. 7 is a sectional view taken along the line 7—7 of Fig. 4.

Fig. 8 is a sectional view of a car frame including a ball bearing support for the turntable.

Fig. 9 is an end view of the car partly in cross section.

Fig. 10 is a detailed view of a portion of the loading platform showing wheel locks.

Fig. 11 is a sectional view along lines 11—11 of Fig. 10.

Fig. 12 is another view of the rollers shown in Fig. 11.

Fig. 13 is a sectional view of the wheel lock.

Fig. 14 is a perspective view of another embodiment of the invention.

Fig. 15 is a side view of the car shown in Fig. 14.

Fig. 16 is a sectional view taken along the lines 16—16 of Fig. 15.

Throughout the drawing like parts are designated by the same reference numerals.

Figure 1:
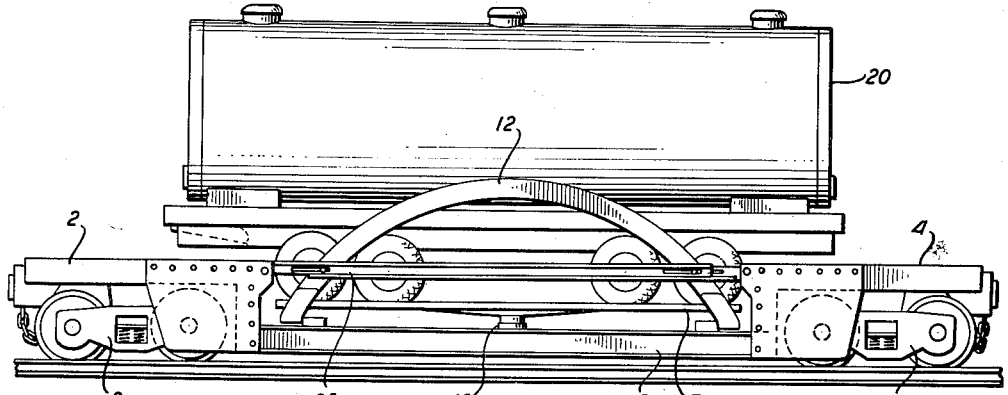
Fig. 1 is a side view of a railroad car according to the invention with a trailer thereon.
Figure 2:
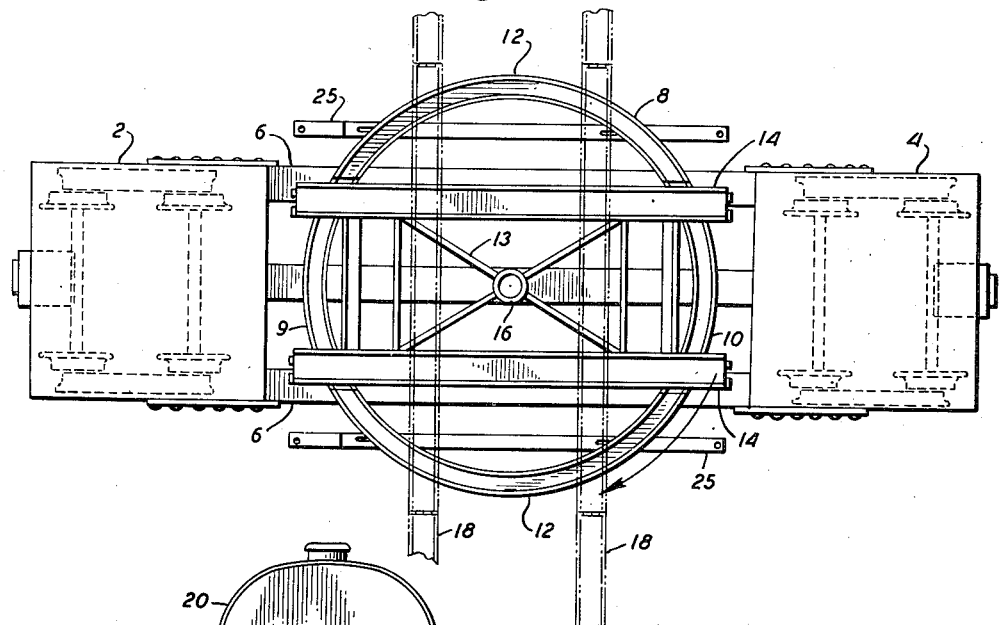
Fig. 2 is a top view of the car, without the trailer, with the circular track lowered.
Figure 3:
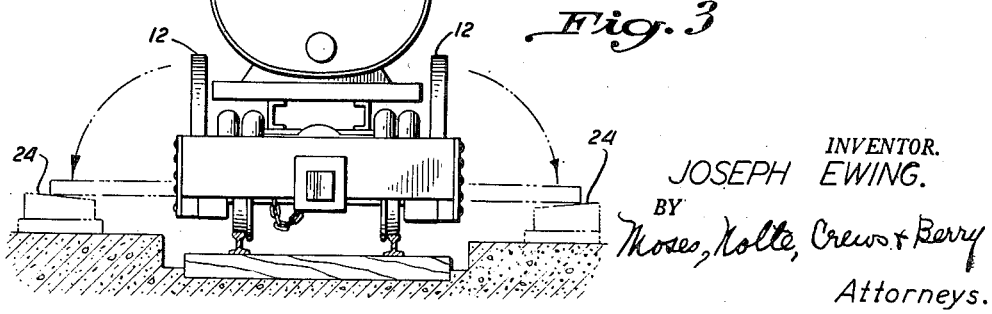
Fig. 3 is an end view of the car and trailer.

Figs. 1–4 show a railroad car adapted to be coupled to other cars to form an articulated train. The car includes a frame having end portions 2 and 4 and supported by trucks 3 and 5. The end portions are connected by a dropped center portion 6. The center portion 6 pivotally supports a turntable 7 having a circular track 8 consisting of two fixed arcuate tracks 9 and 10 and two hinged arcuate tracks 12. A loading platform 13 including a pair of tracks 14, supported on roller assembly 15, is adapted to rotate about a pivot 16. Tracks 14 have end ramps 18 connected thereto by hinges 19.

When a trailer 20 is to be loaded on the car, the arcuate sections 12 of the circular track 8 are lowered so that the entire circular track 8 lies in one plane. Suitable supports, such as the wedge shaped supports 24, may be used to support tracks 12. Tracks 12 are provided with a crossbar 25 which may consist of two angle bars 26 and 27 fastened to the circular track sections 12 (Figs. 5 and 6) by rivets 28. Rivets 28 extend through slots 29 and 30 in angle bars 26 and 27 so as to permit the angle bars to slide relative to each other. Crossbar 25 is therefore extensible so that it may be belted by belts 31 to the sides of the car. The track sections 12 are connected by hinges 32 to frame 6 of the car. Hinges 32 are provided with a step 33 for holding tracks 12 in a horizontal position.

After tracks 12 are lowered to the horizontal position, they are braced by the supports 24. The loading platform 13 is then turned on circular track 8 to the transverse position shown in Fig. 4. End ramps 18 may be attached by hinges 19 to tracks 14 and placed in the position shown in Fig. 4. The end ramps 18 may, of course, remain attached to tracks 14 when not in use. The trailer 20 may then be driven by its power unit over end ramps 18 onto the loading platform 13.

As shown in Figs. 10 and 13, loading platform tracks 14 may be provided with a series of holes 40 to permit wheel locks 41 to be belted to tracks 14. The wheel locks 41 may be applied to the front and rear wheels of the trailer. The trailer 20 may then be decoupled from its power unit, which may then be driven away. End ramps 18 are then raised or removed by being de-hinged. The loading platform 13 is then turned to its longitudinal position. The loading platform may be locked in this position by passing a bolt 42 through hole 43 (Fig. 4) and bracket 44, which may be welded to circular track 10, as shown in Fig. 7. A nut 45 on bolt 42 fastens track 14 to track 10. Circular track sections 12 are then pivoted into vertical positions and belted to the sides of the car. The trailer 20 is then ready for railway transit. When it is desired to unload the trailer the procedure described above is reversed and a power unit for a trailer is driven onto the loading platform, coupled to the trailer and the trailer is then pulled away to its destination.

Fig. 8 shows a loading platform 13 which is supported by roller assembly 15 on circular track 8 and in addition is supported on frame 6 by a ball bearing assembly 50. In this figure the loading platform is in its transverse or loading position. The bearing assembly 50 and circular track 8 form concentric tracks about pivot 16 to provide a low friction turntable having maximum support.

By virtue of the fact that turntable 8 has hinged sides 12, it is possible for it to have a diameter which is much greater than the permissible width of the railroad car, and in fact the diameter can be made substantially equal to the length of the tracks 14 of the loading platform. Hence the turntable 8 supports the loading platform 13 out of its ends. In this manner the loading platform is provided with a base giving it maximum support. Cantilever effects at the ends of the loading platform are avoided and effects of great and possibly unbalanced forces which might twist, tip or bend the loading platform 13 are reduced to a minimum.

The roller assembly 15 for the loading platform 13 is shown in detail in Figs. 11 and 12. It consists of a pair of rollers 55 mounted on a preferably curved carriage 56 consisting of two angle irons 57 having the same curvature as circular track 8. The axles of rollers 55 are preferably radial to circular track 8, so that rollers 55 travel over the track with minimum friction.

Figs. 14–16 show a car having a dropped center portion frame 60 consisting of longitudinal beams and cross beams suitably fastened together. The loading platform 61 includes a plurality of longitudinal channels 62 and diagonal channels or beams 63 forming a rigid support for a solid floor 64. A pair of ramps 65 are hinged to the platform 61. Loading platform 61 is rotatably mounted on frame 60 by turntable 66. The turntable includes at least a pivot 67 and a roller bearing assembly 68. The bearing assembly includes upper and lower raceways 69 and 70 and a plurality of frusto-conical roller bearings 71. The bearing assembly 68 and pivot 67 thus form a rotary support for the loading platform. The larger and smaller diameters of the bearings have a ratio such that the inner and outer ends of the bearings will roll round the inner and outer circumferences of the raceways without any sliding friction. Loading platform 61 is provided with a hole 72 adapted to register with a hole 73 on the car frame so that the platform may be fastened in its longitudinal position by a bolt 74. Any suitable means may be provided for fastening down the end ramps 65 and wheel locks or other suitable means may be provided for preventing movement of the trailer on the car while in transit.

The car shown in Figs. 14–16 may be loaded by backing or pulling a trailer onto the loading platform by the automobile power unit which normally pulls the trailer. The loading is facilitated by the solid floor of the loading platform. Moreover a car of the type shown in Figs. 14–16 can be used as a flat car for other types of hauling when it is not being used for hauling trailers.

It will be understood that the bearing assembly 68 may be used in place of the bearing assembly 50 shown in Fig. 8, and that a circular track turntable such as shown in Figs. 1–8 may also be used to provide additional support for loading platform 61 of Figs. 14–16.

The foregoing description and accompanying drawing are illustrative of certain embodiments of my invention but it will be understood that many variations and modifications thereof may be made within the spirit and scope of my invention as defined by the following claims.

I claim:

1. A railroad car for transporting automobile trailers having front and rear end portions each including a car truck individual thereto, a dropped center frame portion interconnecting the two end portions, a loading platform adapted to receive and carry a trailer, a turntable for rotatably supporting said loading platform on said frame portion, said turntable having a diameter greater than the width of said car and substantially equal to the length of said loading platform, wherein said turntable includes front and rear sections and a side section on each side of the car, means for hinging the side sections to the car frame so that they can be turned from a horizontal plane to vertical planes.

2. A railroad car according to claim 1 including means for fastening the side sections of the turntable to the front and rear end portions of the car in substantially vertical positions so that said side sections form sides of the car along the length of the dropped center portion thereof.

3. A railroad car for transporting automobile trailers having front and rear end portions each including a car truck individual thereto, a dropped center frame portion interconnecting the two end portions, a loading platform adapted to receive and carry a trailer, a turntable for rotatably supporting said loading platform on said frame portion, said turntable having a diameter greater than the width of said car and substantially equal to the length of said loading platform, said turntable including a circular track having a diameter substantially equal to the length of the loading platform, and roller means for rotatably supporting said loading platform on said track, wherein said circular track includes front and rear sections fastened to the car frame and two side sections, the front and rear sections having a width substantially equal to the width of the car, means for hinging each side section to the front and rear sections on a horizontal axis parallel to the length of the car to adapt said side sections to extend outwardly from the sides of the car, an extensible bar connected to each side section, and means for fastening one end of each bar to the front portion of the car and the other end to the rear portion of the car.

References Cited in the file of this patent

UNITED STATES PATENTS

| | | |
|---|---|---|
| 1,271,812 | Wagner | July 9, 1918 |
| 1,541,457 | Winn | June 9, 1925 |
| 1,734,303 | Ross | Nov. 5, 1929 |
| 2,190,708 | Fowler | Feb. 20, 1940 |
| 2,246,543 | Smith | June 24, 1941 |
| 2,373,148 | Smith | Apr. 10, 1945 |